United States Patent
Singh et al.

(10) Patent No.: US 10,902,365 B2
(45) Date of Patent: Jan. 26, 2021

(54) IDENTIFYING RECURRING SERIES FROM TRANSACTIONAL DATA

(71) Applicant: Yodlee, Inc., Redwood City, CA (US)

(72) Inventors: Chanpreet Singh, Bangalore (IN);
Harini Padmanabhan, Bangalore (IN);
Vinay Nagaraj, San Jose, CA (US);
Prasad Vunnam, Bangalore (IN)

(73) Assignee: Yodlee, Inc., Redwood City, CA (US)

( * ) Notice: Subject to any disclaimer, the term of this patent is extended or adjusted under 35 U.S.C. 154(b) by 168 days.

(21) Appl. No.: 15/647,184

(22) Filed: Jul. 11, 2017

(65) Prior Publication Data

US 2018/0181895 A1    Jun. 28, 2018

(30) Foreign Application Priority Data

Dec. 23, 2016 (IN) .............................. 201641044067

(51) Int. Cl.
*G06Q 10/00* (2012.01)
*G06Q 10/06* (2012.01)
*G06Q 40/00* (2012.01)

(52) U.S. Cl.
CPC ....... *G06Q 10/06315* (2013.01); *G06Q 40/12* (2013.12)

(58) Field of Classification Search
None
See application file for complete search history.

(56) References Cited

U.S. PATENT DOCUMENTS

| | | | | |
|---|---|---|---|---|
| 8,615,420 | B2* | 12/2013 | Holliday | G06Q 30/0201 705/7.31 |
| 10,387,883 | B2* | 8/2019 | Wang | G06N 20/00 |
| 10,445,839 | B2* | 10/2019 | Chang | G06Q 10/067 |
| 10,558,989 | B2* | 2/2020 | Phillips | G06Q 30/0205 |
| 2009/0132347 | A1* | 5/2009 | Anderson | G06Q 30/02 705/14.52 |
| 2009/0276346 | A1* | 11/2009 | Rukonic | G06Q 40/00 705/35 |
| 2010/0250338 | A1* | 9/2010 | Banerjee | G06Q 20/20 705/16 |

(Continued)

OTHER PUBLICATIONS

International Application No. PCT/US2017/068208, Notification of Transmittal of the International Search Report and the Written Opinion of the International Searching Authority, dated Apr. 16, 2018, 11 pages.

*Primary Examiner* — Joseph M Waesco
(74) *Attorney, Agent, or Firm* — Fish & Richardson P.C.

(57) ABSTRACT

Methods, systems and computer program products for identifying recurring series from transactional data are disclosed. An analytic server receives transactional data. The server reduces the transactional data to one or more series of transactions. The analytic server identifies one or more features in each series of transactions. The analytic server determines a respective recurrence score for each series of transactions based on training data. The recurrence score measures a likelihood that the series of transactions is a recurring series, in which transactions recur. The analytic server determines whether each series of transactions is a recurring series based on the respective recurrence score and a threshold. The analytic server predicts a future transaction based on the recurring series of transactions.

20 Claims, 8 Drawing Sheets

(56) References Cited

U.S. PATENT DOCUMENTS

| | | | |
|---|---|---|---|
| 2011/0153650 A1* | 6/2011 | Lee | G06F 16/10 707/769 |
| 2011/0238550 A1* | 9/2011 | Reich | G06Q 30/02 705/35 |
| 2011/0295722 A1* | 12/2011 | Reisman | G06Q 30/0641 705/27.1 |
| 2012/0137367 A1* | 5/2012 | Dupont | G06F 21/00 726/25 |
| 2012/0203708 A1* | 8/2012 | Psota | G06Q 30/06 705/347 |
| 2013/0173419 A1* | 7/2013 | Farber | G06Q 30/0631 705/26.7 |
| 2014/0074649 A1* | 3/2014 | Patel | G06Q 30/0631 705/26.7 |
| 2014/0156513 A1* | 6/2014 | Psota | G06Q 30/02 705/39 |
| 2015/0046218 A1* | 2/2015 | Sewak | G06Q 30/0202 705/7.31 |
| 2015/0073929 A1* | 3/2015 | Psota | G06Q 50/28 705/26.2 |
| 2015/0220983 A1* | 8/2015 | Chauhan | G06Q 30/0255 705/14.53 |
| 2016/0104187 A1* | 4/2016 | Tietzen | G06Q 30/0233 705/14.33 |
| 2017/0249697 A1* | 8/2017 | Agrawal | G06Q 40/025 |
| 2018/0268015 A1* | 9/2018 | Sugaberry | G06N 3/063 |

\* cited by examiner

IDENTIFYING RECURRING SERIES FROM TRANSACTIONAL DATA

TECHNICAL FIELD

This disclosure relates generally to data analysis.

BACKGROUND

A computer server system configured to handle user transactions can hold huge amount of transactional data. For example, a computer server system serving various content can receive numerous requests for certain content from various users, and provide the content in response. The requests can include, for example, incoming telephonic calls, email messages, or submitted Web forms. Some of the transactions may be recurring. A mechanism that can identify recurring transactions may open up opportunities in building multiple applications that can help the server system to predict its resource needs, identify possible bottlenecks, and plan ahead for future demand.

SUMMARY

Techniques of identifying recurring series from transactional data are disclosed. An analytic server receives transactional data. The server reduces the transactional data to one or more series of transactions. The analytic server identifies one or more features in each series of transactions. The analytic server determines a respective recurrence score for each series of transactions based on training data. The recurrence score measures a likelihood that the series of transactions is a recurring series, in which transactions recur. The analytic server determines whether each series of transactions is a recurring series based on the respective recurrence score and a threshold. The analytic server predicts a future transaction based on the recurring series of transactions.

In some implementations, a method of identifying recurring series from transactional data is performed by a system including one or more processors and a non-transitory storage medium storing instructions that cause the one or more processors to perform the following operations. The system receives transactional data. The transactional data includes records of transactions. The system reduces the transactional data to one or more series of transactions. Each series of transactions includes a set of the records of transactions based on similarities between the transactions. The system identifies one or more features in each series of transactions. The system determines a respective recurrence score for each series of transactions based on the one or more features and training input. The system determines whether each series of transactions is a recurring series based on the respective recurrence score and a threshold. The system then predicts a future transaction based on recurring series of transactions.

Each of the records of transactions can include a respective label of an interaction between multiple computing devices or between a human and a computing device, a respective time of the interaction, and a value indicating a magnitude of the transaction. The label can include a description of the interaction. Predicting the future transaction can include estimating a time and a magnitude of the future transaction based on time and magnitude information in the series of transactions that is determined to be repetitive.

The operations of reducing the transactional data to one or more series of transactions can include determining similarity scores based on the labels in the records of transactions, and grouping a first transaction and a second transaction into a series of transactions upon determining that the similarity scores between the first transaction and the second transaction satisfies a first similarity threshold. The operations can include determining a size of the grouped series of transactions, measured in number of transactions in the series. Upon determining that the size is greater than a size threshold, the system can determine if the similarity score between the first transaction and the second transaction satisfies a second similarity threshold. The system can split the series of transactions including the first transaction and the second transaction upon determining that the similarity score fails to satisfy the second similarity threshold.

Identifying the one or more features can include determining a respective coefficient of variance of magnitude in each series of transactions, and designating each coefficient of variance of magnitude as a respective feature of the series of transaction. Identifying the one or more features can include determining a respective coefficient of variance of date differences in each series of transactions, and designating each coefficient of variance of date differences as a respective feature of the series of transaction.

Identifying the one or more features can include determining a respective category for each series of transactions based on token lists, each token list corresponding to a category. Determining the respective category can occur in response to identifying, in one or more records of transactions in the series of transactions, an appearance of one or more tokens in a token list corresponding to the respective category. The system can designate each category as a respective feature of the series of transactions.

Identifying the one or more features can include determining a respective periodicity indicator for each series of transactions, the periodic indicator indicating whether time of the series of transactions has a recurring pattern. The system can designate each periodicity indicator as a respective feature of the series of transactions.

In some implementations, before reducing the transactional data to the one or more series of transactions, the system pre-filters the received transactional data. Pre-filtering the transactional data can include the following operations. The system can designate a first transaction of the transactions as repetitive in response to determining that an identifier of a party of the first transaction, as specified in a corresponding record, belongs to a specified group of parties. The system can designate a second transaction of the transactions as repetitive in response to determining that a description of the second transaction, as specified in a corresponding record, includes a token that is in a specified group of tokens. The system can filter out the first transaction and the second transaction from the transactional data before the reducing operations.

The features described in this specification can achieve one or more advantages. A content server implementing the disclosed techniques improves upon conventional content servers by predicting future load by identifying past transactions that may recur, thereby provisions resources ahead of need. A customer service center implementing the disclosed techniques improves upon conventional customer service optimization techniques by identifying requests that may recur, thereby providing valuable information on a product or service that may require inventory restocking or customer care. A financial planning institution implementing the disclosed techniques may be able to predict recurring income and expenditure of a customer, and thereby forecast a user of potential future cash flow, or forewarn a potential customer default. A medical facility may use the techniques to predict which patient may revisit the facility at which frequency for what medical condition.

The details of one or more implementations of the disclosed subject matter are set forth in the accompanying drawings and the description below. Other features, aspects and advantages of the disclosed subject matter will become apparent from the description, the drawings and the claims.

BRIEF DESCRIPTION OF THE DRAWINGS

Like reference symbols in the various drawings indicate like elements.

DETAILED DESCRIPTION

Figure 1:
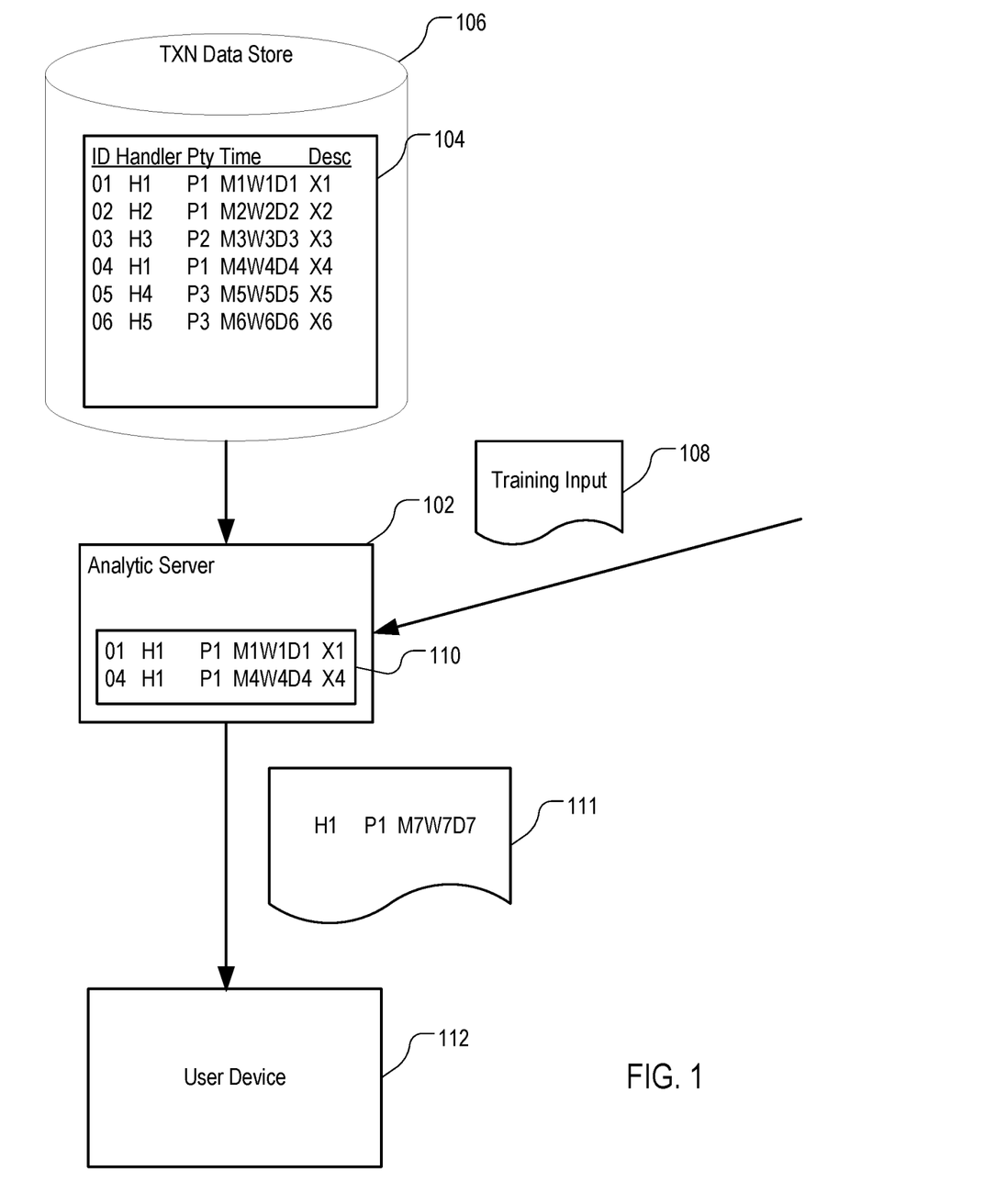
FIG. 1 is a diagram illustrating an example system to perform techniques of identifying recurring series from transactional data.

FIG. 1 is a diagram illustrating an example system to perform techniques of identifying recurring series from transactional data. In the example shown, an analytic server 102 is configured to implement the techniques. The analytic server 102 can include one or more computers.

The analytic server 102 receives transactional data 104 from a transaction database 106. The transaction database 106 includes one or more storage devices storing the transactional data 104. Examples of a transaction database 106 include a log server, an action data store, or a general ledger of various agencies. The agencies can include, for example, an interactive content provider, e.g., a news provider that allows readers to posts comments; an on-line shop that allows users to buy goods or services, e.g., prescription medicine or pet food; a healthcare network that serves new and existing patients.

The transactional data 104 includes one or more records of transactions. A transaction can be an instance of interaction between a first user and a second user (e.g., between two humans), a user and a computer, or a computer and a computer, that has been recorded by a transaction server. Each record can have multiple fields. The fields can include, for example, the following. The fields can include a transaction identifier identifying the transaction. The transaction identifier may be unique for each record and can identify the record. In the example shown, the transactional data 104 includes six records, identified by transaction identifiers 01 through 06.

The fields can include a first party identifier and a second party identifier to identify the two respective parties of the respective transaction. The first party identifier can identify the user or computer that initiated the transaction. The second party identifier can identify the user or computer that fulfilled the transaction. For example, for a health care application, the first party identifier could identify the patient and the second party identifier could identify the doctor or hospital; for a financial application, the first party identifier could identify the buyer (e.g., the customer) and the second party identifier could identify the seller (e.g., a restaurant, retail store, etc.).

The fields can include an identifier of a handler of the transaction. The handler can be an intermediary (e.g., a card agency or a bank) between parties of the transaction. The fields can include date and time field for a time of the respective transaction. The fields can include one or more label fields, e.g., a description field for storing a description of the respective transaction. The fields can include one or more quantity fields (not shown) that represent a magnitude, e.g., one or more quantities, of each transaction. The quantities can include, for example, size of items downloaded, number of units of goods or services bought, or amounts that customers paid for the goods or services.

Upon receiving the transactional data 104, the analytic server 102 determines one or more series of transactions from the transactional data 104. A series of transactions can include a group of transactions that are sufficiently interrelated to one another but are less related with transactions that are outside of the group. Each transaction may belong to one or more series. For example, the analytic server 102 can group the transactions in the transactional data 104 based on similarities between the descriptions X1 through X7, and group those records that are sufficiently similar to one another. Additional details on determining one or more series of transactions are described in reference to FIG. 2.

The analytic server 102 then determines which ones of the series of transactions are recurring series. The analytic server 102 can determine a frequency of the recurrence, or time interval between recurrence of transactions. The analytic server 102 can determine that a series of transactions is a recurring series upon determining that a likelihood that transactions in the series recur at predictable time in the future exceeds a threshold. The analytic server 102 can make the determination using various techniques, including, for example, by performing feature extraction, by training using input 108 of truth data, by scoring, among others. In addition, before determining the series of transactions, the analytic server 102 can pre-filter the transactional data 104. Various techniques of determining recurring series of transactions are described in further details below in reference to subsequent figures.

In the example shown, the analytic server 102 determines that a series 110 of transactions is a recurring series. The analytic server 102 can determine that the series 110 of transactions include transactions identifiable by identifiers "01" and "04" due to, for example, the transactions are initiated by a same user, e.g., a customer, are handled by a same handler "H1," have a same party "P1," e.g., an online grocery store, and have similar descriptions X1 and X4. Based on the time of occurrence of the transactions 01 and 04, and a respective magnitude of the transactions 01 and 04, the analytic server 102 can produce prediction 111. The prediction 111 can include an estimate that a future transaction between the user and the party P1 will be handled by the handler P1, and will likely occur at a future time M7W7D7 indicating a month, a week of the month, and a day of the week. The prediction 111 can include an estimated magnitude of the transaction, e.g., a number of unit that will be purchased or an amount of payment that will be made. The analytic server 102 can estimate the future time M7W7D7 based on time of the transactions 01 and 04 in the series 110. For example, the analytic server 102 can determine that the transactions 01 and 04 both occurred on a first Monday of consecutive months January and February. The analytic server 102 can then determine that the future time M7W7D7 will be the first Monday of the next Month, March.

In addition, the prediction 111 can include an estimate on an effect that the future transaction on the user or the party P1. For example, the prediction 111 can include an estimate on an inventory increase of the user or an inventory decrease of the party P1, or an increase or decrease in the user's or the party's account. The analytic server 102 can make the determination based on the estimated magnitude of the transaction, which, in turn, is based on the magnitude of the transactions 01 and 04 in the series 110. For example, upon determining that a user buys ten bags of cat food on the first Monday of consecutive months January and February, the analytic server 102 can determine that the user is likely to buy another ten bags of cat food at future time M7W7D7, on the first Monday of the March. Accordingly, the inventory of cat food of the party P1 will decrease by ten bags at the future time M7W7D7.

The analytic server 102 can provide the prediction 111 to a user device 112. For example, upon receiving an inquiry of account status from the party P1 through a Web browser executing on the user device 112, the analytic server 102 can cause a message to be displayed in the browser, indicating that at future time M7W7D7, the party P1 is likely to receive another order of a given amount, in this case, ten bags of cat food. The message can include an account receivable balance computed based on a current price of the cat food. The message can include a warning for restocking the cat food if the analytic server 102 determines, from stored account information, that the party P1 is running low in stock on cat food. The user device 112 can generate an output in response to the message, e.g., by displaying the message, printing the message, or reading the message on a speech output device.

Figure 2:
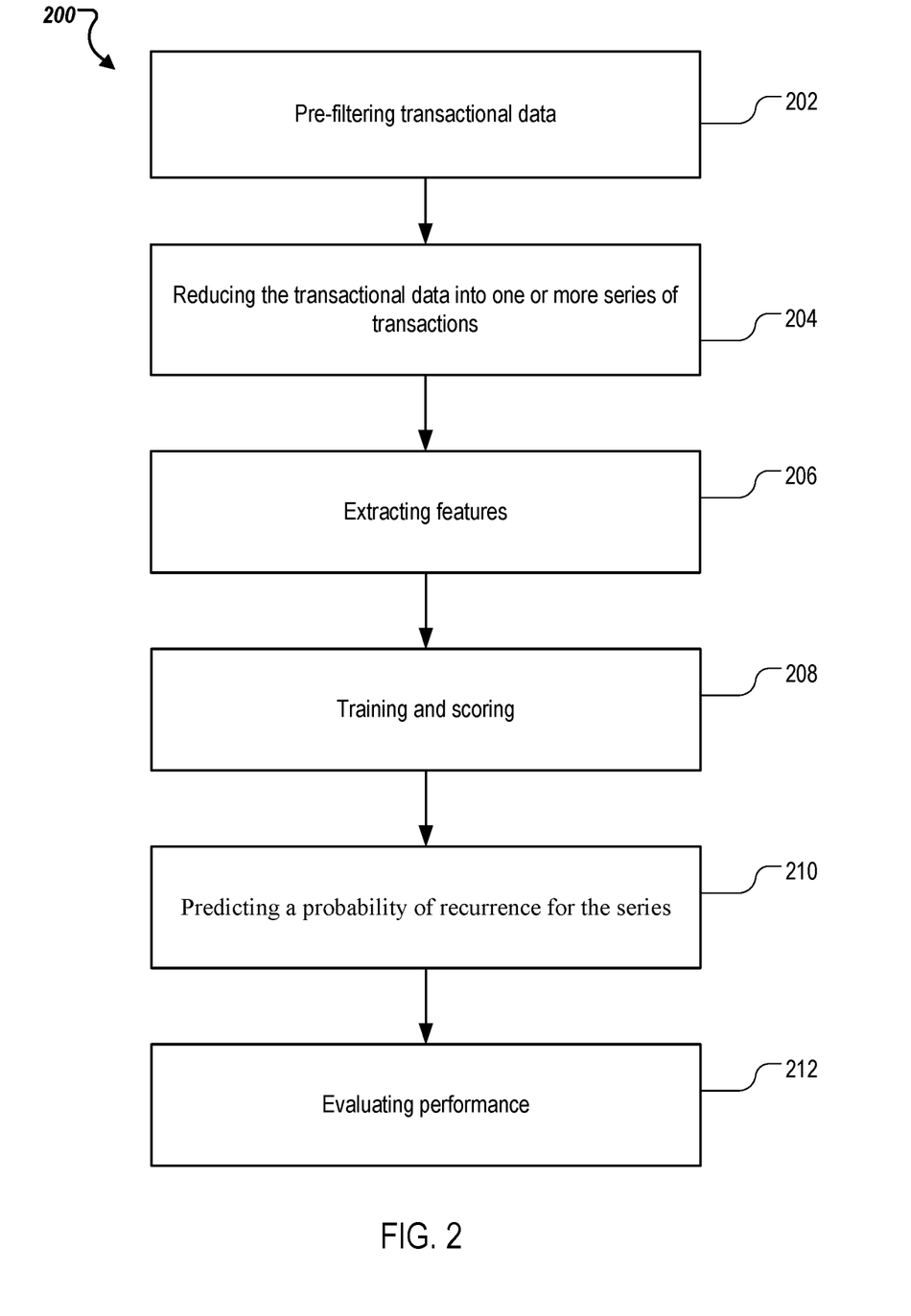
FIG. 2 is a flowchart illustrating an example process of identifying recurring series from transactional data.

FIG. 2 is a flowchart illustrating an example process 200 of identifying recurring series from transactional data. The process 200 can be performed by a system including one or more processors, e.g., the analytic server 102 of FIG. 1. The process 200 provides a mechanism which can group the transactional data into one or more series of transaction. The output of the process 200 includes a prediction on the probability of recurrence of the series of transactions. The input to the process 200 is at a transactional level. The output of process 200 can be at series level. The process 200 follows a multilayered approach which addresses the problem transforming transactions into series by grouping the transactions at a first layer, followed by applying a supervised learning model at a second layer that can predict the probability of recurrence for the series.

The system, upon receiving transactional data, pre-filters (202) the transactional data. Pre-filtering operations 202 can recognize that some transactions are so likely to recur, that the system can predict a future occurrence without having to perform further operations of grouping. The system can remove these transactions from reduction operations 204 described below. Additional details on pre-filtering operations 202 are described below in reference to FIG. 3.

The system then reduces (204) the pre-filtered transactional data. The result of the reduction operations 204 is one or more series of transactions. Additional details of the reducing operations are described in reference to FIG. 4.

The system extracts (206) features of each of the series of transactions. Extracting the features includes determining one or more characteristics, or lack of characteristics, of each series of transactions. Additional details of the feature extraction operations are described in reference to FIG. 5.

The system performs training and scoring operations (208) on the extracted features. The system passes the extracted features through a supervised algorithm to determine model objects. The system scores the series based on the model objects obtained from supervised learning. Additional details of the training and scoring operations (208) are described in reference to FIG. 6.

The system predicts (210) a respective probability of recurrence for each of the series. The system can use the probability to predict a future transaction. The system can provide the probability of recurrence to various analytical engines for modeling the transactions, or to a user device for output. Optionally, the system evaluates (212) performance of various stages of the process 200 using statistical tools.

Figure 3:
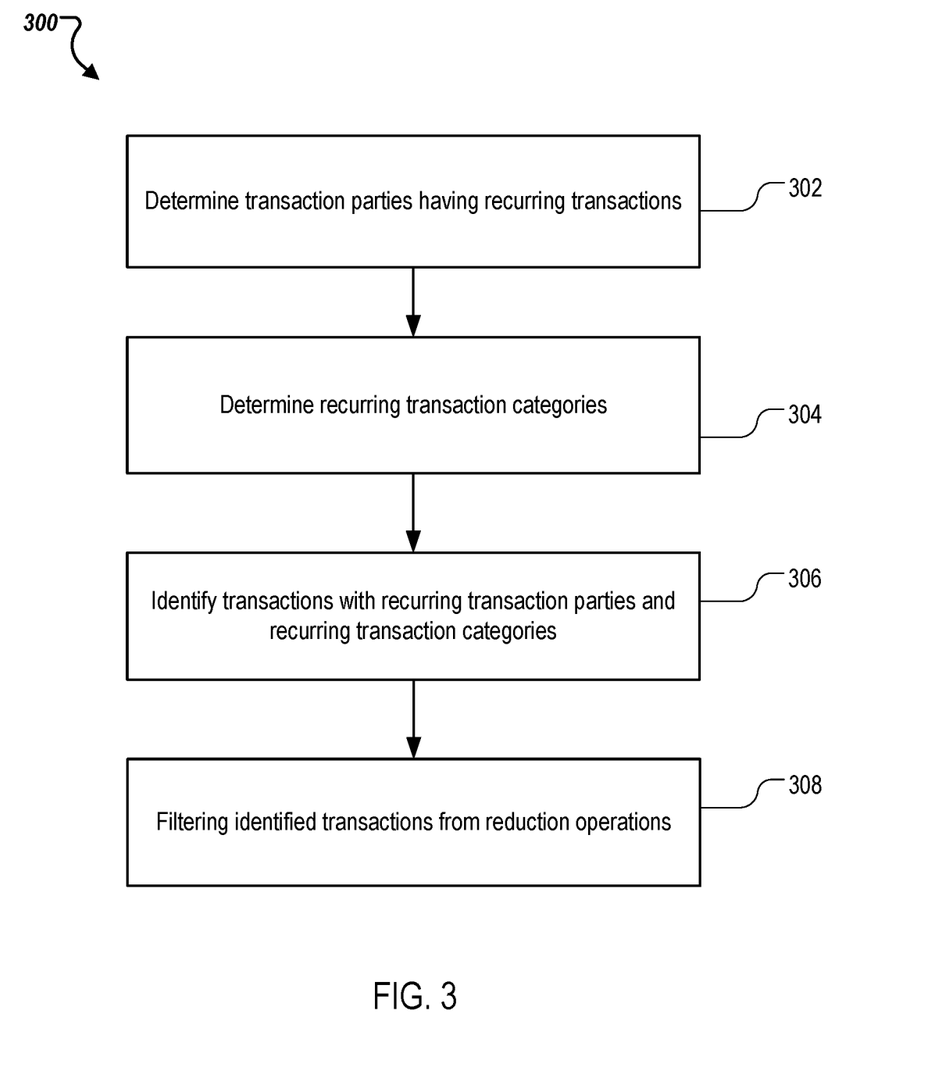
FIG. 3 is a flowchart illustrating an example process of pre-filtering transactional data.

FIG. 3 is a flowchart illustrating an example process 300 of pre-filtering transactional data. Process 300 is an example of the pre-filtering operations 202 of FIG. 2. The process 300 can be performed by a system including one or more processors, e.g., the analytic server 102 of FIG. 1, or any other suitable system.

The system determines (302) transaction parties that have recurring transactions. These parties can be entities that are determined to always have recurring transactions. For example, the system can determine that a residential Internet service provider, a telephone service operator, or a utility company are parties having recurring transactions of payments. The system can determine identifiers of these parties, e.g., names, and frequency of the recurrence, e.g., monthly or bi-monthly, based on historical data. The system can store such identifiers in a recurring transaction party database.

The system determines (304) recurring transaction categories. A transaction category can be determined based at least in part on a description of a transaction in a transaction record. The system can determine that certain tokens in the description, e.g., "payroll," "utility" or "telephone/cable" are likely associated with recurring transactions. The system can store such tokens in a recurring category database.

The system identifies (306), from received transactional data, records of transactions that are associated with parties of recurring transactions and transactions that are associated with recurring categories. The system can make the identification by comparing corresponding fields in the records with the identifiers and tokens in the transaction party database and the recurring party database.

The system filters (308) the identified transactions from reduction operations. The filtering can include removing the transactions with the parties of the recurring transaction from the reduction operations. The filtering can include marking the transactions that have recurring categories for separate processing in the reduction. For example, the system can mark transactions having recurring categories for a path in reduction that is different from other transactions, where only two transactions can form a series and can establish a periodicity for the series. Additional details on pre-filtering for reduction to series based on recurring categories are described in reference to FIG. 4.

Figure 4:
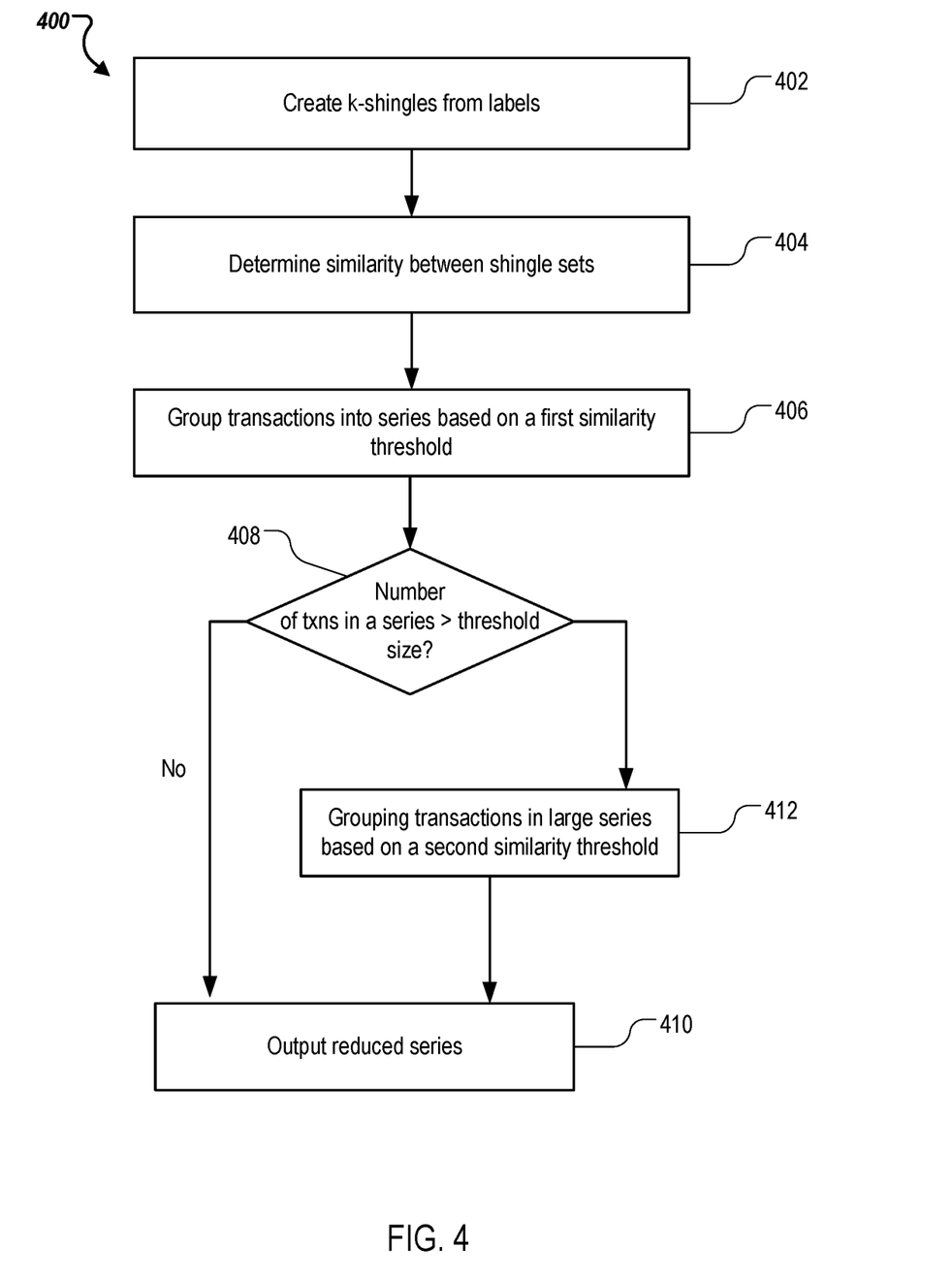
FIG. 4 is a flowchart illustrating an example process of reducing transactional data to one or more series of transactions.

FIG. 4 is a flowchart illustrating an example process 400 of reducing transactional data to one or more series of transactions. Process 400 is an example of the reduction operations 204 of FIG. 2. The process 400 can be performed by a system including one or more processors, e.g., the analytic server 102 of FIG. 1, or any other suitable system. The system can feed the pre-filtered transactional data as input to process 400.

The system creates (402) k-shingles from the transactional data. The system can create the k-singles from a specific field of each record of transaction. The field can be a label field that includes a description of the transaction, e.g., "purchase cat food brand ABC from store P1" as entered by a transaction participant, by an agency, or by a computer. Each k-shingle, also referred to as a k-gram, can be a sequence of k tokens from the data field. Each token can be, for example, a word or a number. The system can group the k-shingles in to sets.

The system determines (404) similarities between k-single sets. Determining the similarities can include, for example, calculating a Jaccard similarity between each two sets.

The system can group (406), in a first stage of reduction the transactions represented by the records based on a first similarity threshold. For example, the system can group a first transaction and a second transaction into a same series upon determining that the similarity between the k-single sets of a description of a record representing the first transaction and a description of a record representing the second transaction satisfies a first similarity threshold, e.g., greater than 0.35. The system can add other transactions represented by records whose calculated similarities to the first record and the second record satisfy the similarity threshold to this series of transactions. A series of transactions, accordingly, is a group of transactions of similar type or purpose. For example, the system can determine that transactions of buying pet food and transactions of paying utility bills are two distinct series of activities.

After grouping the transactions into series, the system determines a respective size of each series of transactions, and determine (408) whether each size satisfies a size threshold. The size of a series of transactions can be measured by number of transactions in the series. The size threshold is a value, e.g., six, that corresponds to the number of records in the transactional data, such that large series are broken down into smaller series unless the system is confident that the large series are indeed series of transactions of the same type.

Upon determining that a size of a series of transactions does not exceed the size threshold, the system can output (410) that series of transactions for a next stage of processing. Upon determining that a size of a series of transactions does not exceed the size threshold, the system can group (412), in a second stage of reduction, transactions in that series of transactions based on a second similarity threshold, e.g., 0.1. The system can output (410) those series of transactions that satisfy the second similarity threshold. The system can perform feature extraction on the output, an example of which is described below in reference to FIG. 5.

Figure 5:
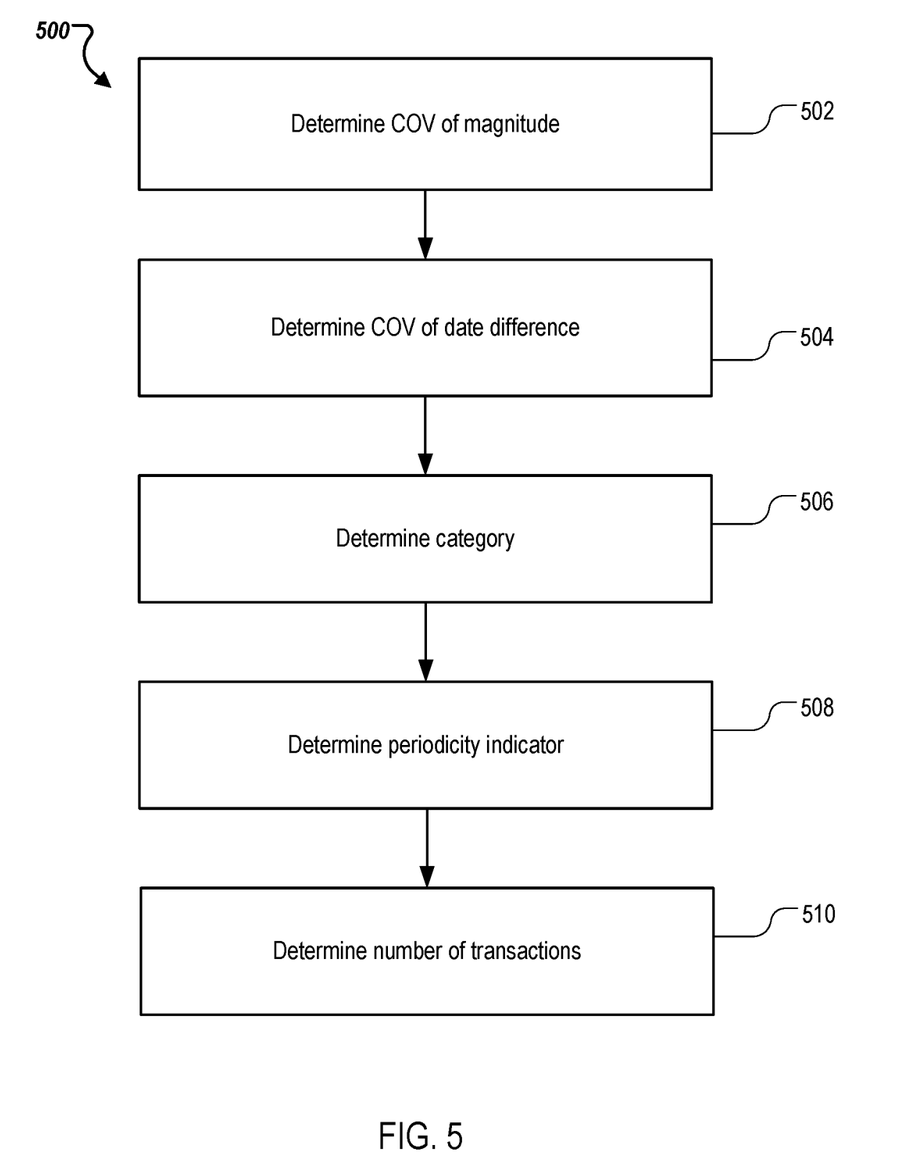
FIG. 5 is a flowchart illustrating an example process of feature extraction.

FIG. 5 is a flowchart illustrating an example process 500 of feature extraction. Process 500 is an example of the feature extraction operations 206 of FIG. 2. The process 500 can be performed by a system including one or more processors, e.g., the analytic server 102 of FIG. 1, or any other suitable system. The system can feed the series of transactions as input to process 500.

The system determines (502) a respective coefficient of variance of magnitude of transactions in each series. The magnitude can be a size, e.g., size of content downloaded, an amount, e.g., a payment amount, or a count, e.g., number of units of goods or services exchanged. The magnitude can be stored in a field of each record of a transaction in the series. The system can determine the coefficient of variance using various techniques, for example, by using Equation 1 below:

$$COVm = \frac{\text{variance(magnitude)}}{\text{mean(magnitude)}}, \quad (1)$$

where COVm is the coefficient of variance of magnitude.

The system determines (504) a respective coefficient of variance of date difference of transactions in each series. The data difference can be difference between date and optionally, time, of each transaction, e.g., the number for days between M1W1D1 and M4W4D4 of the series 110 of FIG. 1. The system can determine the coefficient of variance of date difference using various techniques, for example, by using Equation 2 below:

$$COVd = \frac{\text{variance}(\Delta\text{date})}{\text{mean}(\Delta\text{date})}, \quad (2)$$

where COVd is the coefficient of date difference, Δdate is the date difference, e.g., 30 days or 14 days.

The system determines (506) a category for each series. A category of a series of transaction can be an indicator indicating a level of confidence that a series of transactions is a recurring series. The category of a series of transactions can be different from a category of a transaction as described above for pre-filtering. The category of a series of transactions can indicate, for example, that the level of confidence is high, medium and low. The system can designate a series of transaction as belonging to a category of high confidence level upon determine that a label, e.g., descriptions, of transaction includes specified tokens that are associated with repetitive behavior. The tokens can include, for example, "cable services," "utility," "mortgage" or "paycheck." The system can designate a series of transaction as a category of low confidence level upon determine that a label, e.g., descriptions, of transaction includes specified tokens that are associated with non-repetitive behavior. The tokens can include, for example, "online services," "dining," "pet care" or "gifts." The system can designate those series of transactions not categorized as high confidence level or low confidence level as having a medium confidence level.

The system determines (508) a respective periodicity indicator for each series. The periodicity indicator can be a flag of true or false. The system can assign a true value to the periodicity indicator of a series upon determining that the all date differences follow a daily, weekly, bi-weekly, tri-weekly, or a monthly trend. The system can assign a false value to the periodicity indicator of a series otherwise. For example, the system can fit a linear function to timestamps in the records, and then determine a variance of the timestamps from the function. The system can set the flag to be true upon determining that the variance is below a threshold.

The system determines (510) a respective number of transactions in each series of transactions. This number can be provided by process 400 as described in reference to FIG. 4. The system can perform the operations of process 500 in any order. The system designates the coefficients of variance of magnitude, the coefficients of date difference, the category levels, the period flags, and the numbers of transactions as the features of the series of transactions.

Figure 6:
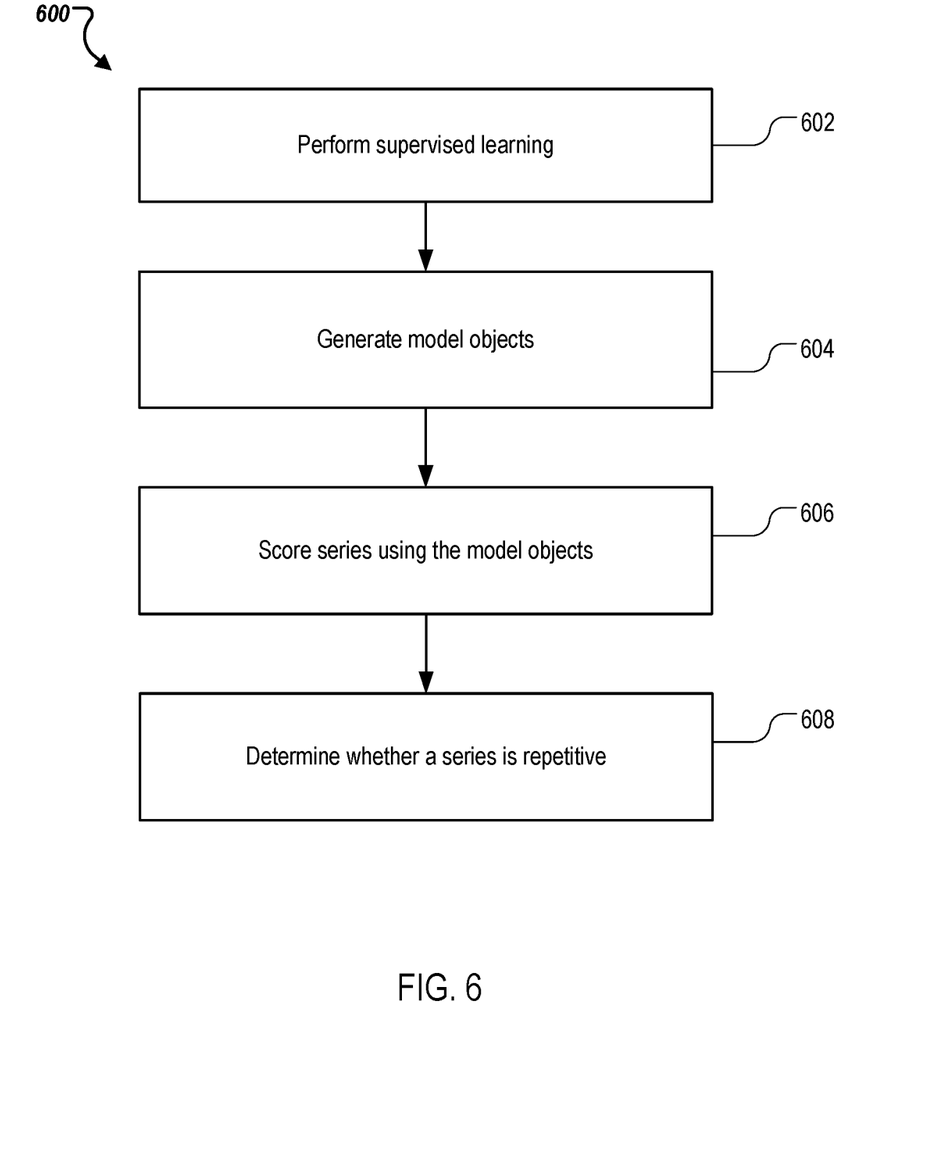
FIG. 6 is a flowchart illustrating an example process of training and scoring series of transactions for recurrence.

FIG. 6 is a flowchart illustrating an example process 600 of training and scoring series of transactions for repetitiveness. The process 600 is an example of the training and scoring operations 208 of FIG. 2. The process 600 can be performed by a system including one or more processors, e.g., the analytic server 102 of FIG. 1, or any other suitable system. The system can feed the series of transactions and associated features extracted by process 500 as input to the process 600.

The system performs (602) supervised learning on the features. The supervised learning can be based on multiple decision trees, e.g., a random forest with 1000 trees. The system determines (604) model objects from the supervised learning. The model objects can be R-objects, when R programming language is used for programming the supervised learning. The system the scores (606) series of transactions based on the model objects. The result is a respective recurrence score for each series transactions. The system then determines (608) whether a series of transactions is repetitive or non-repetitive using the recurrence scores and a threshold. For example, the system can determine that a particular series of transactions is repetitive upon determining that the recurrence score of the series satisfies the threshold.

Figure 7:
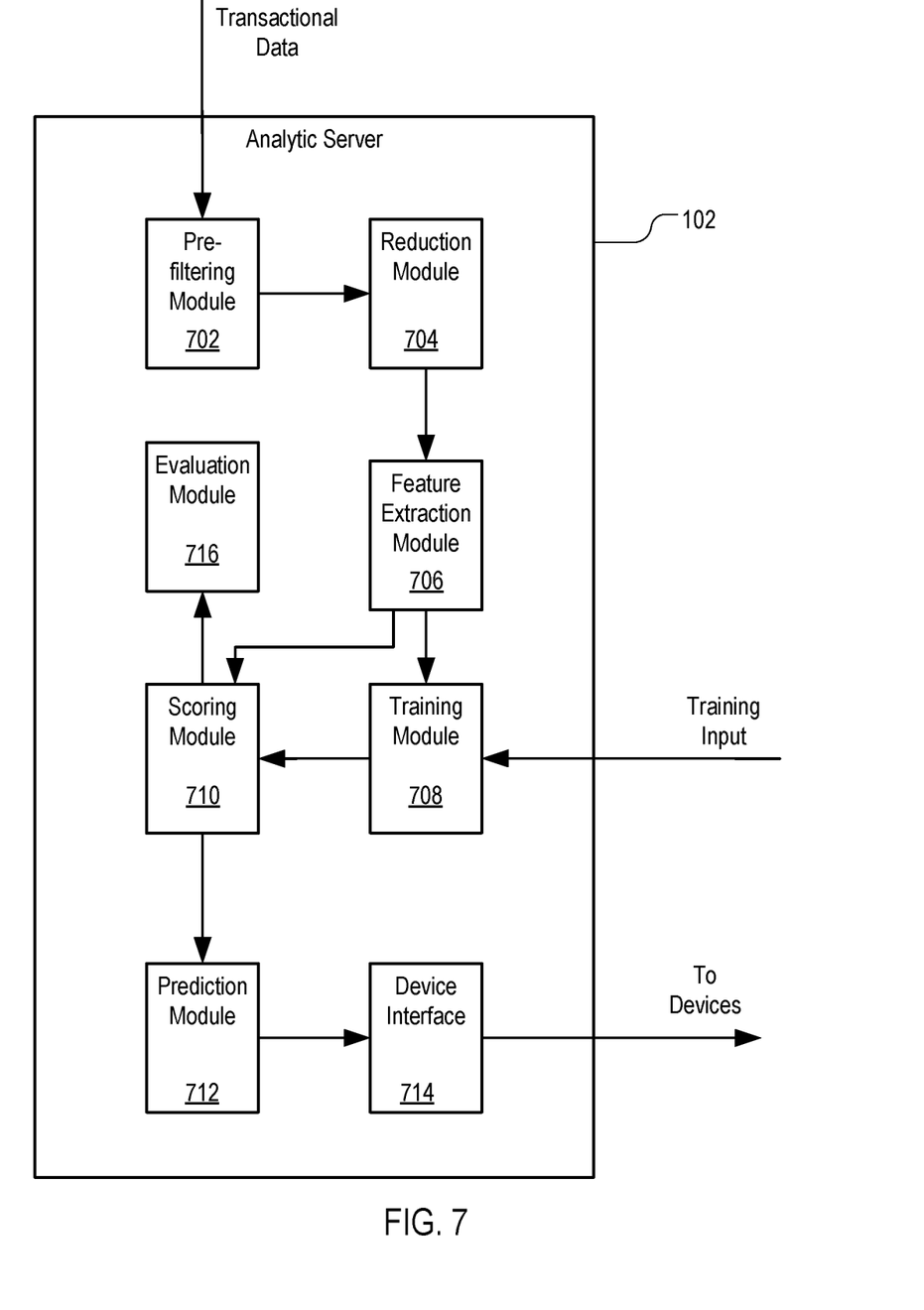
FIG. 7 is a block diagram illustrating components of an example analytic server implementing the techniques of identifying recurring series from transactional data.

FIG. 7 is a block diagram illustrating components of an example analytic server 102 implementing the techniques of identifying recurring series from transactional data. Each component of the analytic server 102 can include one or more processors configured to perform respective operations.

The analytic server 102 includes a pre-filtering module 702 configured to perform pre-filtering operations described in reference to FIG. 3. The analytic server 102 includes reduction module 704 configured to receive output from the pre-filtering module 702 and perform reduction operations described in reference to FIG. 4. The analytic server 102 includes a feature extraction module 706 configured to receive output from the reduction module 704 and perform feature extractions operations described in reference to FIG. 5. The analytic server 102 includes feature extraction module 706

The analytic server 102 includes a training module 708. The training module 708 is configured to generate model objects based on features on a set of series of transaction as extracted by the feature extraction module 706 and based on training input. The analytic server 102 includes a scoring module 710. The scoring module 710 is configured to score series of transactions based on features of the transactions provided by the feature extraction module 706 and model objects provided by the training module 708. The scoring module 710 can determine which series of transactions are repetitive. The analytic server 102 includes a prediction module 712 configured to predict a future transaction, including a future time that the transaction may occur and a magnitude of the future transaction. The prediction can be associated with a confidence value indicating a probability of the future transaction.

The analytic server 102 includes a device interface 714 configured to communicate with a user device and, upon request, provide a prediction to the user device for presentation to a user. The device interface 714 can include, for example, a Web server.

The analytic server 102 can include an evaluation module 716. The evaluation module 716 is configured to determine performance of the scoring. For example, the evaluation module 716 can measure the performance in terms of mean average precision (MAP) and mean average recall (MAR) over user identifiers. The evaluation module 716 can provide feedback that adjusts various parameters of the pre-filtering, reduction, feature extraction, training and scoring operations. For example, the evaluation module 716 can increase or decrease thresholds for grouping transactions during reduction.

Figure 8:
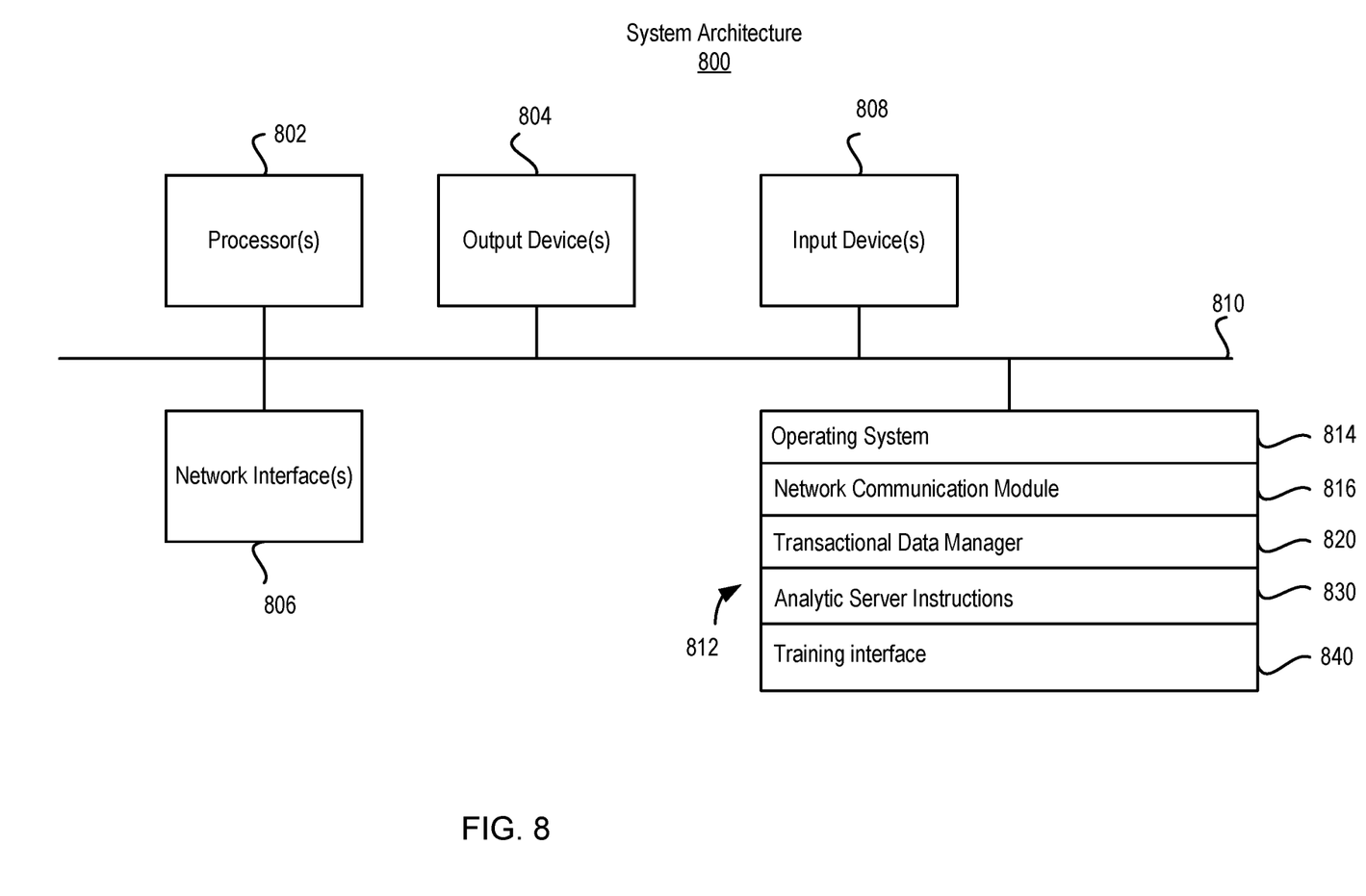
FIG. 8 is a block diagram of an example system architecture for implementing the systems and processes of FIGS. 1-7.

FIG. 8 is a block diagram of an example system architecture for implementing the systems and processes of FIGS. 1-7. Other architectures are possible, including architectures with more or fewer components. In some implementations, architecture 800 includes one or more processors 802 (e.g., dual-core Intel® Xeon® Processors), one or more output devices 804 (e.g., LCD), one or more network interfaces 806, one or more input devices 808 (e.g., mouse, keyboard, touch-sensitive display) and one or more computer-readable mediums 812 (e.g., RAM, ROM, SDRAM, hard disk, optical disk, flash memory, etc.). These components can exchange communications and data over one or more communication channels 810 (e.g., buses), which can utilize various hardware and software for facilitating the transfer of data and control signals between components.

The term "computer-readable medium" refers to a medium that participates in providing instructions to processor 802 for execution, including without limitation, non-volatile media (e.g., optical or magnetic disks), volatile media (e.g., memory) and transmission media. Transmission media includes, without limitation, coaxial cables, copper wire and fiber optics.

Computer-readable medium 812 can further include operating system 814 (e.g., a Linux® operating system), network communication module 816, transactional data manager 820, analytic server instructions 830 and training interface 840. Operating system 814 can be multi-user, multiprocessing, multitasking, multithreading, real time, etc. Operating system 814 performs basic tasks, including but not limited to: recognizing input from and providing output to devices 806, 808; keeping track and managing files and directories on computer-readable mediums 812 (e.g., memory or a storage device); controlling peripheral devices; and managing traffic on the one or more communication channels 810. Network communications module 816 includes various components for establishing and maintaining network connections (e.g., software for implementing communication protocols, such as TCP/IP, HTTP, etc.).

Transactional data manager 820 can include computer instructions that, when executed, cause processor 802 to perform functions of collecting, formatting and storing transactional data. Analytic server instructions 830 can include computer instructions that, when executed, cause processor 802 to perform operations of the analytic server 102 as described in reference to FIGS. 1-7. Training interface 840 can include computer instructions that, when executed, cause processor 802 to receive training input.

Architecture 800 can be implemented in a parallel processing or peer-to-peer infrastructure or on a single device with one or more processors. Software can include multiple software components or can be a single body of code.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, a browser-based web application, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor or a retina display device for displaying information to the user. The computer can have a touch surface input device (e.g., a touch screen) or a keyboard and a pointing device such as a mouse or a trackball by which the user can provide input to the computer. The computer can have a voice input device for receiving voice commands from the user.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

A system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

A number of implementations of the invention have been described. Nevertheless, it will be understood that various modifications can be made without departing from the spirit and scope of the invention.

What is claimed is:

1. A method comprising:
  receiving, from a database server at an analytic server, transactional data, the transactional data including records of transactions, wherein each record includes one or more fields for one or more of a magnitude of a corresponding transaction and a date of the corresponding transaction;
  identifying, within each record of the transactional data, one or more fields corresponding to one or more of the magnitude of the corresponding transaction and the date of the corresponding transaction;
  retrieving, from the identified one or more fields of the transactional data, values for one or more of a corresponding magnitude and a corresponding date;
    reducing, at the analytic server using the values, the transactional data to one or more series of transactions, each series transactions including a set of the records of transactions, inclusion of transactions in the set being based on similarities between the transactions;

retrieving, using the analytic server, from each record in the one or more series of transactions one or more of a plurality of magnitudes and a plurality of dates;

calculating, based on one or more of the plurality of magnitudes and a plurality of dates, one or more of a coefficient of variance of magnitude or a coefficient of variance of date in each series of transactions;

identifying a set of one or more features corresponding to each series of transactions, the one or more features including one or more of the corresponding calculated coefficient of variance of magnitude or the corresponding calculated coefficient of variance of date;

providing, for each series of transactions, a model input comprising the corresponding set of features as input to a supervised learning model, wherein the supervised learning model has been configured through training to generate recurrence scores, the training comprising:

processing one or more training inputs using the supervised learning model to generate respective recurrence scores corresponding to the training inputs, determining a performance of the supervised learning model on the training inputs, and determining an update to a plurality of parameters of the supervised learning model based on the determined performance;

obtaining, for each series of transactions, a network output comprising a respective recurrence score for the series of transactions from the supervised learning model;

determining whether each series of transactions is a recurring series based on the recurrence scores; and generating a prediction of a future transaction based on a series of transactions that is determined to be a recurring series.

2. The method of claim 1, wherein:
each of the records of transactions includes a respective label of an interaction between a plurality of computing devices or between a human and a computing device, a respective time of the interaction, and a value indicating a magnitude of the transaction; and generating a prediction of the future transaction comprises estimating a time and a magnitude of the future transaction based on time and magnitude information in the series of transactions that is determined to be a recurring series.

3. The method of claim 2, wherein reducing the transactional data to one or more series of transactions comprises:
determining similarity scores based on the labels in the records of transactions;
grouping a first transaction and a second transaction into a series of transactions upon determining that the similarity scores between the first transaction and the second transaction satisfies a first similarity threshold;
determining a size of the series of transactions;
upon determining that the size is greater than a size threshold, determining if the similarity score between the first transaction and the second transaction satisfies a second similarity threshold; and
splitting the series of transactions including the first transaction and the second transaction upon determining that the similarity score fails to satisfy the second similarity threshold.

4. The method of claim 1, wherein identifying the set of one or more features corresponding to each series of transactions comprises:
determining a respective category for each series of transactions based on token lists, each of the token lists corresponding to a category, wherein determining the respective category is in response to identifying, in one or more records of transactions in the series of transactions, an appearance of one or more tokens in a token list corresponding to the respective category; and
designating each category as a respective feature of the series of transactions.

5. The method of claim 1, wherein identifying the set of one or more features corresponding to each series of transactions comprises:
determining a respective periodicity indicator for each series of transactions, the periodicity indicator indicating whether time of the series of transactions has a recurring pattern; and
designating each periodicity indicator as a respective feature of the series of transactions.

6. The method of claim 1, comprising, before reducing the transactional data to the one or more series of transactions, pre filtering the received transactional data, the pre filtering comprising:
designating a first transaction of the transactions as repetitive in response to determining that an identifier of a party of the first transaction, as specified in a corresponding record, belongs to a specified group of parties;
designating a second transaction of the transactions as repetitive in response to determining that a description of the second transaction, as specified in a corresponding record, includes a token that is in a specified group of tokens; and
filtering out the first transaction and the second transaction from the transactional data before the reducing.

7. The method of claim 1, wherein the supervised learning model comprises a random forest.

8. The method of claim 7, wherein the supervised learning model comprises at least 1000 decision trees.

9. A system comprising:
one or more processors; and
a non-transitory computer-readable medium storing instructions that, when executed by the one or more processors, cause the one or more processors to perform operations comprising:
receiving transactional data, the transactional data including records of transactions, wherein each record includes one or more fields for one or more of a magnitude of a corresponding transaction and a date of the corresponding transaction;
identifying, within each record of the transactional data, one or more fields corresponding to one or more of the magnitude of the corresponding transaction and the date of the corresponding transaction;
retrieving, from the identified one or more fields of the transactional data, values for one or more of a corresponding magnitude and a corresponding date;
reducing, using the values, the transactional data to one or more series of transactions, each series transactions including a set of the records of transactions, inclusion of transactions in the set being based on similarities between the transactions;
retrieving from each record in the one or more series of transactions one or more of a plurality of magnitudes and a plurality of dates;
calculating, based on one or more of the plurality of magnitudes and a plurality of dates, one or more of a coefficient of variance of magnitude or a coefficient of variance of date in each series of transactions;

identifying a set of one or more features corresponding to each series of transactions, the one or more features including one or more of the corresponding calculated coefficient of variance of magnitude or the corresponding calculated coefficient of variance of date;
providing, for each series of transactions, a model input comprising the corresponding set of features as input to a supervised learning model, wherein the supervised learning model has been configured through training to generate recurrence scores, the training comprising:
processing one or more training inputs using the supervised learning model to generate respective recurrence scores corresponding to the training inputs,
determining a performance of the supervised learning model on the training inputs, and
determining an update to a plurality of parameters of the supervised learning model based on the determined performance;
obtaining, for each series of transactions, a network output comprising a respective recurrence score for the series of transactions from the supervised learning model;
determining whether each series of transactions is a recurring series based on the recurrence scores; and
generating a prediction of a future transaction based on a series of transactions that is determined to be a recurring series.

10. The system of claim 9, wherein:
each of the records of transactions includes a respective label of an interaction between a plurality of computing devices or between a human and a computing device, a respective time of the interaction, and a value indicating a magnitude of the transaction; and
generating a prediction of the future transaction comprises estimating a time and a magnitude of the future transaction based on time and magnitude information in the series of transactions that is determined to be a recurring series.

11. The system of claim 10, wherein reducing the transactional data to one or more series of transactions comprises:
determining similarity scores based on the labels in the records of transactions;
grouping a first transaction and a second transaction into a series of transactions upon determining that the similarity scores between the first transaction and the second transaction satisfies a first similarity threshold;
determining a size of the series of transactions;
upon determining that the size is greater than a size threshold, determining if the similarity score between the first transaction and the second transaction satisfies a second similarity threshold; and
splitting the series of transactions including the first transaction and the second transaction upon determining that the similarity score fails to satisfy the second similarity threshold.

12. The system of claim 9, wherein identifying the set of one or more features corresponding to each series of transactions comprises:
determining a respective category for each series of transactions based on token lists, each of the token lists corresponding to a category, wherein determining the respective category is in response to identifying, in one or more records of transactions in the series of transactions, an appearance of one or more tokens in a token list corresponding to the respective category; and
designating each category as a respective feature of the series of transactions.

13. The system of claim 9, wherein identifying the set of one or more features corresponding to each series of transactions comprises:
determining a respective periodicity indicator for each series of transactions, the periodicity indicator indicating whether time of the series of transactions has a recurring pattern; and
designating each periodicity indicator as a respective feature of the series of transactions.

14. The system of claim 9, the operations comprising, before reducing the transactional data to the one or more series of transactions, pre filtering the received transactional data, the pre filtering comprising:
designating a first transaction of the transactions as repetitive in response to determining that an identifier of a party of the first transaction, as specified in a corresponding record, belongs to a specified group of parties;
designating a second transaction of the transactions as repetitive in response to determining that a description of the second transaction, as specified in a corresponding record, includes a token that is in a specified group of tokens; and
filtering out the first transaction and the second transaction from the transactional data before the reducing.

15. A non-transitory computer-readable medium storing instructions that, when executed by one or more processors, cause the one or more processors to perform operations comprising:
receiving transactional data, the transactional data including records of transactions, wherein each record includes one or more fields for one or more of a magnitude of a corresponding transaction and a date of the corresponding transaction;
identifying, within each record of the transactional data, one or more fields corresponding to one or more of the magnitude of the corresponding transaction and the date of the corresponding transaction;
retrieving, from the identified one or more fields of the transactional data, values for one or more of a corresponding magnitude and a corresponding date;
reducing, using the values, the transactional data to one or more series of transactions, each series transactions including a set of the records of transactions, inclusion of transactions in the set being based on similarities between the transactions;
retrieving from each record in the one or more series of transactions one or more of a plurality of magnitudes and a plurality of dates;
calculating, based on one or more of the plurality of magnitudes and a plurality of dates, one or more of a coefficient of variance of magnitude or a coefficient of variance of date in each series of transactions;
identifying a set of one or more features corresponding to each series of transactions, the one or more features including one or more of the corresponding calculated coefficient of variance of magnitude or the corresponding calculated coefficient of variance of date;
providing, for each series of transactions, a model input comprising the corresponding set of features as input to a supervised learning model, wherein the supervised learning model has been configured through training to generate recurrence scores, the training comprising
processing one or more training inputs using the supervised learning model to generate respective recurrence scores corresponding to the training inputs, determining a performance of the supervised learning model on the training inputs, and determining an update to a plurality of parameters of the supervised learning model based on the determined performance;

obtaining, for each series of transactions, a network output comprising a respective recurrence score for the series of transactions from the supervised learning model;

determining whether each series of transactions is a recurring series based on the recurrence scores; and predicting generating a prediction of a future transaction based on a series of transactions that is determined to be a recurring series.

16. The non-transitory computer-readable medium of claim 15, wherein:

each of the records of transactions includes a respective label of an interaction between a plurality of computing devices or between a human and a computing device, a respective time of the interaction, and a value indicating a magnitude of the transaction; and predicting generating a prediction of the future transaction comprises estimating a time and a magnitude of the future transaction based on time and magnitude information in the series of transactions that is determined to be repetitive a recurring series.

17. The non-transitory computer-readable medium of claim 16, wherein reducing the transactional data to one or more series of transactions comprises:

determining similarity scores based on the labels in the records of transactions;

grouping a first transaction and a second transaction into a series of transactions upon determining that the similarity scores between the first transaction and the second transaction satisfies a first similarity threshold;

determining a size of the series of transactions;

upon determining that the size is greater than a size threshold, determining if the similarity score between the first transaction and the second transaction satisfies a second similarity threshold; and splitting the series of transactions including the first transaction and the second transaction upon determining that the similarity score fails to satisfy the second similarity threshold.

18. The non-transitory computer-readable medium of claim 15, wherein identifying the set of one or more features corresponding to each series of transactions comprises:

determining a respective category for each series of transactions based on token lists, each of the token lists corresponding to a category, wherein determining the respective category is in response to identifying, in one or more records of transactions in the series of transactions, an appearance of one or more tokens in a token list corresponding to the respective category; and designating each category as a respective feature of the series of transactions.

19. The non-transitory computer-readable medium of claim 15, wherein identifying the set of one or more features corresponding to each series of transactions comprises:

determining a respective periodicity indicator for each series of transactions, the periodicity indicator indicating whether time of the series of transactions has a recurring pattern; and designating each periodicity indicator as a respective feature of the series of transactions.

20. The non-transitory computer-readable medium of claim 15, the operations comprising, before reducing the transactional data to the one or more series of transactions, pre filtering the received transactional data, the pre filtering comprising:

designating a first transaction of the transactions as repetitive in response to determining that an identifier of a party of the first transaction, as specified in a corresponding record, belongs to a specified group of parties;

designating a second transaction of the transactions as repetitive in response to determining that a description of the second transaction, as specified in a corresponding record, includes a token that is in a specified group of tokens; and filtering out the first transaction and the second transaction from the transactional data before the reducing.

* * * * *